(No Model.)
J. MENGE.
ROTARY PUMP.
No. 269,443. Patented Dec. 19, 1882.
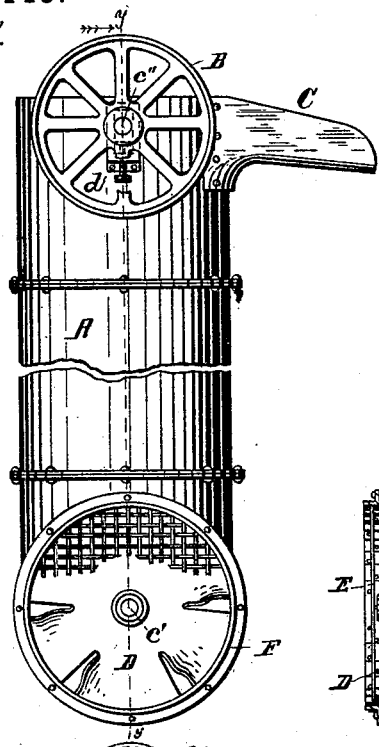
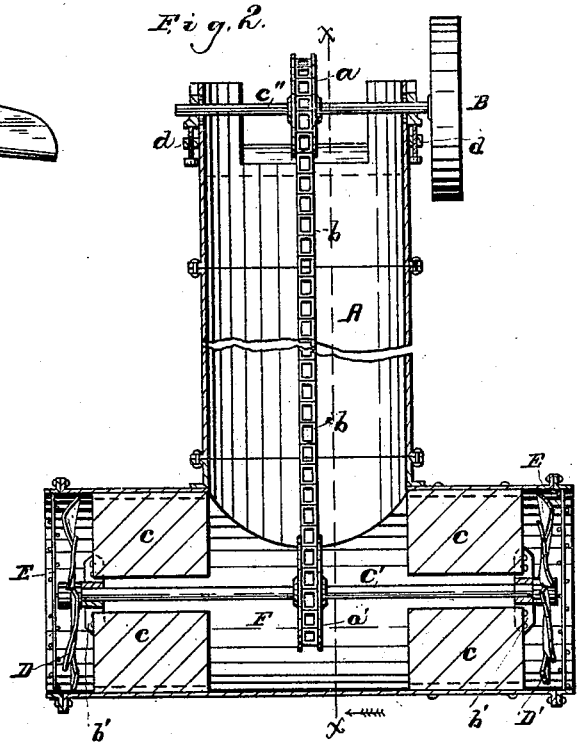
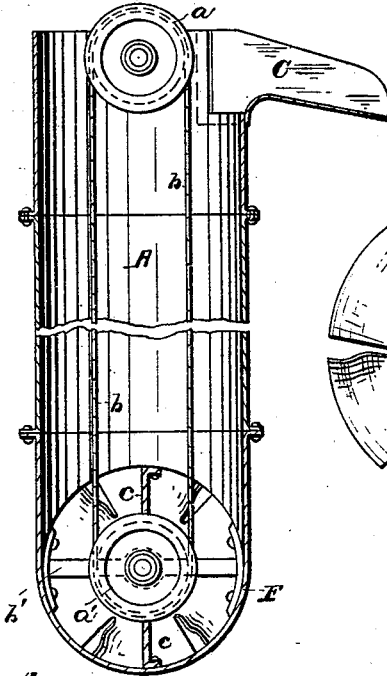
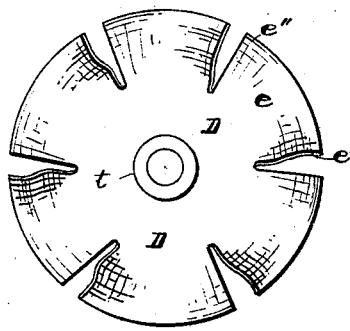
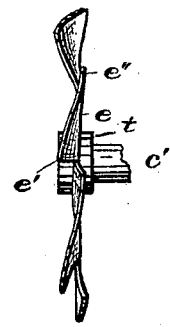
Witnesses.
Inventor.
Joseph Menge,
By George W. Le Vin.
his Attorney.

UNITED STATES PATENT OFFICE.

JOSEPH MENGE, OF NEW ORLEANS, LOUISIANA.

ROTARY PUMP.

SPECIFICATION forming part of Letters Patent No. 269,443, dated December 19, 1882.

Application filed June 21, 1882. (No model.)

*To all whom it may concern:*

Be it known that I, JOSEPH MENGE, a citizen of the United States, residing at New Orleans, in the parish of Orleans and State of Louisiana, have invented certain new and useful Improvements in Rotary Pumps, of which the following is a specification, reference being had to the accompanying drawings, in which—

Figure 1 is a side elevation; Fig. 2, a transverse section taken on the line $y$ $y$ of Fig. 1, looking in the direction indicated by the arrow, as shown; Fig. 3, a vertical section taken on the line $x$ $x$ of Fig. 2; Figs. 4 and 5, details showing the rotating spirally-bladed disks employed.

The object of this invention is to provide an improved device for elevating water, the mechanism illustrated being a pump designed for drainage purposes; but the essential features thereof may be advantageously employed without deviating from the substantial construction shown for the purpose of changing the current of water or projecting it in any desired direction, the mechanism being of dimensions and strength of construction proportionate to the work so required.

In the drawings, A F represent respectively the eduction and induction cylinders, rigidly connected, the latter being T-shaped and the former preferably made in flanged sections, which are bolted or riveted together, forming a simple and economical means for extending said cylinder to a length adequate to the work required in each particular case.

The cylinder F is provided with bearings $b'$ $b'$, in which journals the centrally-located shaft, $c'$, to which is fixed the right and left spirally-bladed disks D D' and the chain-wheel $a'$.

At the upper end of cylinder A, working in suitable take-up boxes, $d$ $d$, is located the shaft $c''$, to which is keyed the drive-wheel B and chain-wheel $a$, the latter carrying the chain $b$, which, working over the chain-wheel $a'$, is the means preferably employed for propelling shaft $c'$ and the disks D D'.

It will be observed that the blades $e$ of the disks D D' do not extend to the hubs $t$ $t$, but for a distance equal to about one-half (more or less) of the radii, and that they are spirally curved, as particularly shown in Fig. 5, so that their leading edges $e'$ occupy a working position outside of the line of the outer face of their respective disks and their following edges $e''$ a like position with reference to the inner face thereof, and that the blades of disk D are curved in reverse to those of disk D'. The disks being put in rotation, the edges $e'$ and $e''$ respectively of the blades cut and project the water into the cylinder F, from which it is forced into cylinder A, to be discharged.

The radial diaphragms $c$ $c$ $c$ $c$ are employed for the purpose of breaking the vortical action of the water projected into the cylinder F.

While in the mechanism shown a chain is employed for propelling shaft $c'$ and the disks D D', I do not limit myself to the use of such chain and the chain-wheel operating in conjunction therewith, as any convenient system of gearing may be substituted therefor, the essential features of my invention consisting in the construction and arrangement of the bladed disks, as described, and their arrangement and operation in and in connection with the cylinders F A, the comparative advantages thereby attained over other pumps being in the avoidance of friction and wear upon the working parts, and its greater capacity for raising or moving water in large volume.

Having thus described my invention, what I claim as new, and desire to secure by Letters Patent, is—

1. In combination with the induction and eduction cylinders F A, the right and left spirally-bladed disks D D', fixed to a shaft, $c'$, and driven by a suitable actuating mechanism operating within said cylinders, substantially as and for the purpose described.

2. The combination of the induction and eduction cylinders F A, shaft $c'$, carrying right and left spirally-bladed disks D D', the whole being operated by a suitable actuating mechanism, with the radial diaphragms $c$, constructed and arranged substantially as and for the purpose described.

JOSEPH MENGE.

Witnesses:
WM. F. SINGLETON,
BENNO LENDECKING.